June 7, 1955 N. J. REES 2,710,121
RECIPROCATING DISK VALVE
Filed May 20, 1952 2 Sheets-Sheet 1
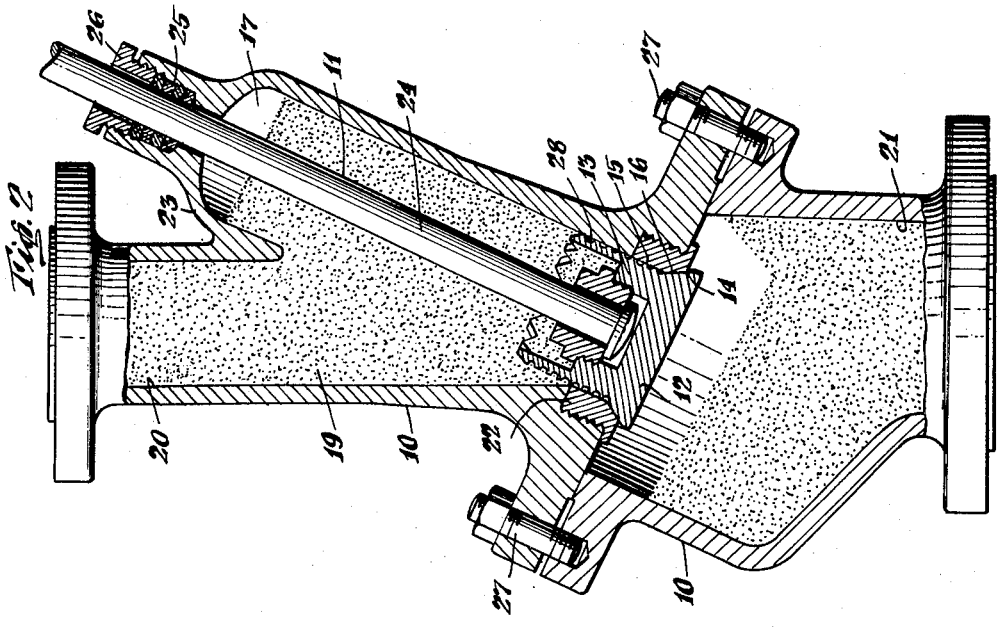
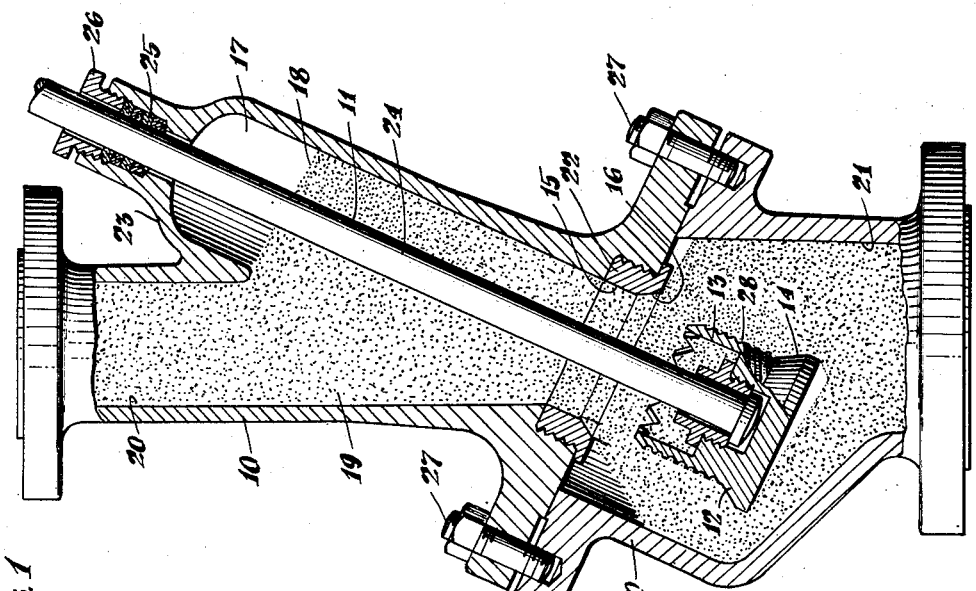
INVENTOR.
Norman J. Rees
BY Andrew L. Jabonault
AGENT

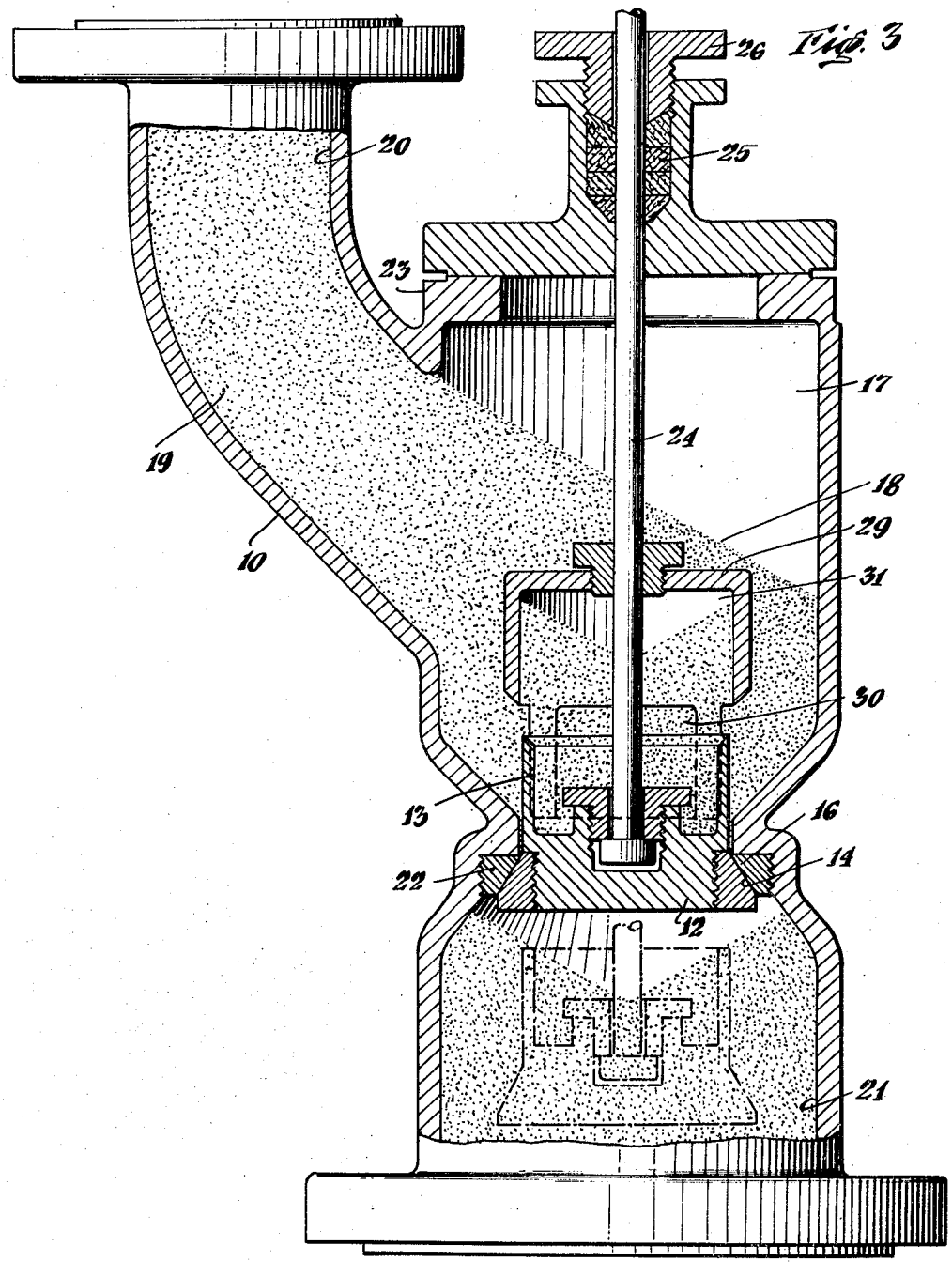

United States Patent Office 2,710,121
Patented June 7, 1955

2,710,121

RECIPROCATING DISK VALVE

Norman J. Rees, Flushing, N. Y., assignor to Socony Mobil Oil Company, Inc., a corporation of New York Application May 20, 1952, Serial No. 288,801

6 Claims. (Cl. 222—510)

This invention has to do with an improved valve and particularly with valves for use with flowing granular solids especially where such solids are at high temperatures. Typical of such applications is the use of valves in lines going to and from the reactors and regenerators of continuous catalytic hydrocarbon reforming and cracking systems wherein the granular solids are continuously cycled between reactor and regenerator.

In such systems a major problem is to find a valve which is capable of closing with granular solids within the body of the valve, particularly where the solids are at high temperatures of the order of 750–1100° F. This difficulty is accentuated when the valve must be closed so as to give a gas tight seal as well as stop the solids flow. Ordinary globe valves or gate valves are obviously not suitable for service with flowing granular solids because the obstruction furnished by the solids therein prevents proper seating. Ordinary plug valves, while suitable for use with granular solids, have the disadvantage that at high temperatures the plug tends to bind and become frozen. This may be overcome by lubrication of the valve but at high temperatures the valve will not remain lubricated for any considerable length of time without constant attention. Also the operating temperature of lubricated plug valves is limited due to melting of the lubricant at higher temperatures.

A major object of this invention is to provide a valve which overcomes the above-described difficulties.

Another object of this invention is to provide a valve for use with high temperature granular contact material.

Another object of this invention is to provide a valve for use in lines in which high temperature contact material and gaseous material are flowing together.

These and other objects of the invention will be apparent from the following discussion of the invention.

Broadly, this invention provides a valve having a body with a passageway extending therethrough from a downwardly facing outlet to an upwardly facing inlet. A downwardly facing seat is provided across the body and a receiving chamber above the seat. The receiving chamber is closed on top and sides so as to enclose a substantial space therein. A stem extends into the body and connects to a disk below the seat. The valve is closed by moving the disk upwardly to the downwardly facing seat. Any granular solids which may be forced upwardly by the closing action are pushed into the receiving chamber from the bottom.

The valve of this invention may be applied to systems using granular solids of either catalytic or inert character. The solids should be of palpable particulate form as distinguished from finely divided powders and the term "granular" as used herein should be understood to include any solids of this form. The granular solids may take the shape of pellets, tablets, spheres, capsules or particles of irregular shape such as are obtained from grinding and screening operations. Generally, the granular solids should be within the range 3 to 100 mesh and preferably within the range about 4 to 20 mesh by Tyler Standard Screen Analysis.

This invention will be best understood by referring to the attached drawings of which, Figure 1 is an elevational view, partially in section of a valve constructed according to this invention, Figure 2 is an elevational view, partially in section of the valve of Figure 1 in the closed position and, Figure 3 is an elevational view, partially in section of a second form of valve constructed according to this invention.

All of these drawings are diagrammatic in form and like parts in all bear like numerals.

Turning to Figures 1 and 2 which are advantageously considered together, there is shown therein a valve with body 10 having a passage 19 extending therethrough from an upwardly facing inlet 20 to a downwardly facing outlet 21. Body 10 is in two sections held together by bolts 27. Extending across body 10 is a downwardly facing annular seat ring 22. The set ring shown has a downwardly facing angular seating surface 16 in its lower section with an upper section 15 in the form of a cylinder. The upper cylindrical portion is not necessary to this invention. Connected into the upper inlet section of body 10 above seat ring 22 and at an angle with passageway 19 is a bonnet 23 which extends upwardly above its intersection with body 10 so as to leave a substantial space 17 above the intersection. The space 17 acts as a receiving chamber, closed on top and sides, for granular solids as is described hereinbelow. A stem 24 extends downwardly into bonnet 23 and centrally through seat ring 22 to a level below the seat ring. A packing gland with packing 25 compressed by packing nut 26 is provided in bonnet 23 for the entrance of stem 24. Connected to the lower end of stem 24 below seat ring 22 is a disk 12 having an upwardly facing surface 14 adapted to conform to the downwardly facing surface 16 of seat ring 22 so that surface 14 of disk 12 will engage surface 16 of seat ring 22 when the disk is moved upwardly. Positioned on top of disk 12 coaxially therewith is a cylinder 13. Cylinder 13 has a diameter such that it will fit closely within seat ring 22, the clearance between the clearance 13 and seat ring 22 being sufficiently small to effect stoppage of the flow of granular solids when the cylinder is moved up into the seat ring. The upper end of cylinder 13 is beveled so that the diameter of the upper end is substantially less than the internal diameter of seat ring 22. This beveled section is serrated so as to present a saw-toothed effect as shown in Figures 1 and 2. Extending around the outer periphery of cylinder 13 are a plurality of helical grooves 28 which are continuous from the bottom of the cylinder to the lower edge of the beveled section of the cylinder. The height of the cylinder 13 is such that a void will be created beneath the disk 12 when the disk rises which is larger than the volume of contact material between surfaces 14 and 16. The cylinder 13 should not be so high that when disk 12 is in its lowermost position flow through seat ring 22 is substantially impaired. Suitable mechanism (not shown) is provided in conjunction with the outer end of stem 24 to effect the movement of disk 12 upwardly and downwardly as desired.

The valve in the open position is shown in Figure 1. Granular solids flow in at 20, through seat ring 22 and around cylinder 13 and disk 12 and out 21. The solids may flow through passageway 19 as a freely falling stream or as a substantially compact stream. This valve is particularly useful when the solids flow as a compact stream. When flowing as a compact mass the granular solids assume their normal angle of repose from the upper point of intersection of bonnet 23 with passageway 19 so as to form a free surface 18 at the bottom of space or receiving chamber 17 in bonnet 23. The normal angle of repose of granular solids, which will be the angle of surface 18 with the horizontal, varies with the particular solid and is generally within the range 25 to 45 degrees. For most granular solids it is about 30 degrees with the horizontal. The volume of space 17 above surface 18, that is, above a line at an angle of 30 degrees below the horizontal from the uppermost line of intersection of bonnet 23 with passageway 19, should be greater than the volume of cylinder 13 and the volume of that portion of disk 12 which extends above the upper edge of the inclined surface 16 of seat ring 22 when the valve is in the completely closed position shown in Figure 2. The volume of the portion of disk 12 which extends above inclined surface 16 when the valve is completely closed, is so small that for all practical purposes it may be ignored. In closing, disk 12 and cylinder 13 are moved upwardly. The granular solids above cylinder 13 are first pushed laterally into the area of passageway 19 below seat ring 22. When the lower edge of the beveled upper section coincides with the upper edge of inclined surface 16 in seat ring 22 the flow of granular solids through the seat ring stops. As the upward movement of 12 and 13 is continued granular solids lying above cylinder 13 are pushed upwardly so as to back up into space 17 in bonnet 23. The granular solids resting on inclined face 14 of disk 12 pass downwardly into the space created beneath 12 by its upward movement so that when face 14 nears face 16 there will be no granular solids resting on 14. Face 14 may then be positioned tightly against 16 to completely close the valve to the position shown in Figure 2. When the valve is completely closed gas flow as well as granular solids flow is stopped. The beveled, serrated upper end of cylinder 13 acts to prevent pinching off of solid particles between cylinder 13 and the cylindrical portion 14 of seat ring 22 because the beveling acts to push the particles between the beveled section and surface 15 upwardly rather than pinching them off between the main body of 13 and surface 15. Any fine material or particles which do get between 13 and 15 falls into grooves 28 which are made larger than the diameter of the granular solids. These grooves have an added function where there is a gas pressure below seat ring 22 greater than the pressure above. This is frequently the situation in hydrocarbon conversion systems, for example, in the pressure lock system of catalytic reforming processes. With this situation gas will flow up through helical grooves 28 when cylinder 13 is within seat ring 22 and force granular solids and fine material out of the grooves. This gas pressure will also force disk 12 tightly against seat ring 22 when the valve is completely closed.

In the valve shown in Figures 1 and 2 passageway 19 passes vertically through body 10 while seat ring 22 is inclined at an angle with the horizontal as are the closing members. Figure 3 illustrates a valve constructed according to this invention wherein the seat ring lies in a horizontal plane while the upper section of passage 19 through body 10 is at an angle with the horizontal. With this exception plus the addition of a separate receiving chamber 29, the parts of the valve of Figure 3 are essentially the same as those of the valve of Figures 1 and 2. The valve of Figure 3 is shown in the closed position with the open position of the disk 12 and cylinder 13 shown by the broken line figure in the lower section of passageway 19. In Figure 3 a receiving chamber 29 is positioned vertically above seat ring 22 and has a diameter greater than the diameter of cylinder 13 on disk 12. Around the lower section of chamber 29 are a plurality of ports 30 for the flow of granular solids from the upper section of passageway 19 to the lower section thereof. A space 31 is provided in the upper section of chamber 29 above the surface formed by the normal angle of repose of granular solids when granular solids are flowing through the open valve, which is greater than the volume of cylinder 13 and the volume of the portion of disk 12 which extends above the upper edge of face 16 when the valve is completely closed. Stated in another fashion, the volume in the upper section of chamber 29 above the surface formed by planes extending downwardly at angles of about 30 degrees from the upper edges of ports 30 should be greater than the volume of cylinder 13 plus the volume of the portion of disk 12 which extends above the upper edge of face 16 on seat ring 22. The valve operates in the same manner as the valve of Figures 1 and 2 with the exception that when the valve is being closed granular solids will be forced upwardly into space 31 in chamber 29. When the valve is completely closed granular solids will have been forced up into space 31 to the position shown in Figure 3. The use of a separate chamber 29 rather than using space 17 in bonnet 23 is a less preferred form of the invention. It does make possible the elimination of space 17 in bonnet 23 if desired. It should be noted that in the valve of Figure 3, however, chamber 29 could be dispensed with and space 17 used to contain the solids forced back by the rising cylinder 13 and disk 12. It will also be noted that cylinder 13 is not equipped with grooves 28 and is not beveled on top as is cylinder 13 in Figures 1 and 2. The use of the grooves and beveling is preferable, however, though not necessary.

The clearance between cylinder 13 and seat ring 22 in the improved valve of this invention should be less than the diameter of the granular solids with which the valve is being used but the clearance should not be so small that cylinder 13 will bind in the seat ring and not move upward freely. Preferably this clearance should be within the range about 0.005 inch to 0.0625 inch. The seat ring and the outer facing of the disk are preferably made of some hard material such as Stellite to withstand the erosive action of the granular solids.

As an example of a suitable construction of a valve according to this invention, a valve adapted to be used in a system for the catalytic reforming of hydrocarbons will be discussed. This valve was designed in the form shown in Figures 1 and 2. It had a 4 inch diameter inlet and a 6 inch diameter outlet. Seat ring 22 had a central opening of 4½ inches in diameter and lay in a plane that made an angle with the horizontal of about 25 degrees. The seating faces 16 made an angle of about 60 degrees with the plane in which seat ring 22 was situated. Disk 12 also lay in a plane at 25 degrees with the horizontal and had faces at angles of 60 degrees with this plane. The disk had a diameter of 5⅜ inches at its lower end. Cylinder 13 had a 4⁷⁄₁₆ inch diameter and was 3 inches high. The upper ¼ inch of the cylinder was beveled at a 20 degree angle and serrated. The remainder of the periphery of the cylinder had helical grooves of ¼ inch diameter. The disk and cylinder were capable of being moved downwardly to a point where the cylinder was 1¼ inches below the seat ring. Bonnet 23 intersected passageway 19 at a 25 degree angle and had a volume above a line drawn at 30 degrees below the horizontal of about 160 cubic inches. Stem 24 was 1¼ inches in diameter.

This invention should be understood to cover all changes and modifications of the example of the invention herein chosen for purposes of disclosure which do not constitute departure from the spirit and scope of the invention.

What is claimed is:

1. A valve for use in lines in which granular solids are flowing, which comprises in combination: a body with passageway extending downwardly therethrough from an upwardly facing inlet to a downwardly facing outlet, a downwardly facing seat ring extending across said body, an upwardly extending valve bonnet above said seat ring connecting into said body at an angle to said passageway extending upwardly above the intersection with said passageway so as to leave a substantial space in the bonnet above said intersection, a stem extending centrally downwardly through said bonnet and said seat ring and adapted to be moved upwardly and downwardly, a disk attached to the lower end of said stem below said seat ring of such a shape that when said stem is moved upwardly said disk will be forced against said seat ring, a cylinder extending upwardly from said disk around said stem to a level such that when said stem is at its lowest downward position the upper end of said cylinder is below said seat ring, said cylinder being of a diameter such that it will pass upwardly through the central opening in said seat ring with a clearance less than the particle size of the granular solids, whereby said valve is closed by moving the stem upwardly from its maximum downward position, granular solids flow first being stopped by the entry of said cylinder into the opening in said seat ring and on further upward movement said disk being forced against said seat ring to completely close the valve.

2. A valve for use with flowing granular solids, which comprises in combination: a body member with passageway extending downwardly therethrough from an upwardly facing inlet to a downwardly facing outlet, a downwardly facing seat ring extending across said body and said passageway, a longitudinally movable stem extending into said body at a level above said seat ring and centrally through the opening in said seat ring to a level therebelow, an upwardly facing disk connected to the lower end of said stem so formed that when it is moved upwardly it will be forced against said seat ring and close said valve, a cylinder extending upwardly from the upper side of said disk around said stem of a diameter such that it will fit within the opening in said seat ring with a clearance within the range about 0.005 to 0.0625 inch, the height of said cylinder being such that when said stem is in its maximum downward position the upper end of said cylinder will be below said seat ring but said height being such that the volume of said cylinder will be in excess of the annular volume around the cylinder between said seat ring and said disk at the position in the upward movement of said cylinder and said disk when said cylinder first enters the opening in said seat ring, an upwardly extending valve bonnet around said stem connecting into said body at an angle with said passageway and extending upwardly above the intersection with said passageway so as to leave a substantial space free of granular solids in the bonnet above said intersection, the volume of said space above a line extending downwardly from the upward point of intersection of said bonnet with said passageway at an angle of 30 degrees with the horizontal being greater than the volume of said cylinder, whereby said valve is closed by moving said stem upwardly so that granular solids flow is stopped when said cylinder first enters said seat ring opening and is completely closed by further upward movement of said stem to force said disk against said seat ring.

3. A valve for use in lines in which granular solids are flowing, which comprises in combination: a body member with passageway extending therethrough from an upwardly facing inlet to a downwardly facing outlet, a downwardly facing seat ring extending across said body, a longitudinally movable valve stem extending into said body from a level above said seat ring and extending downwardly through said seat ring to a level therebelow, a disk connected to the lower end of said stem having an upwardly facing seating surface suitable to stop the flow through the valve when forced against said seat ring, a cylinder extending upwardly from said disk having a diameter which allows the cylinder to fit within the opening of said seat ring with a clearance less than the particle size of the granular solids and of a height such that the upper end of the cylinder will be below the seat ring when said stem is at its lowest position and the volume of said cylinder being in excess of the volume between the downwardly facing seat ring and the upwardly facing seating surface of said disk at the position where said disk and cylinder have been moved upwardly by said stem so that said cylinder just enters said seat ring opening, whereby said valve is closed by moving said cylinder and said disk upwardly by means of said stem, granular solids flow being stopped when said cylinder first enters the said seat ring and the flow of gaseous material being stopped when said disk is forced against said seat ring.

4. A valve for use with flowing granular solids which comprises in combination: a body with passageway extending upwardly therethrough from a downwardly facing outlet to an upwardly facing inlet, a downwardly facing seat across said body with an opening therethrough forming a part of said passageway, a receiving chamber within said valve above said seat and closed on top and sides but opened on the bottom so as to enclose a substantial granular solids-free space therein, a stem extending into said body and connected to a disk below said seat, a cylinder extending upwardly around said stem to a level such that when said disk is moved to its lowest position by said stem the upper end of said cylinder is below said seat and said cylinder being of a diameter such that the cylinder will pass upwardly through the opening in said seat when said stem is moved upwardly with a clearance between said cylinder and the inside edge of said seat less than the particle size of the granular solids, said valve being closed by moving said cylinder and disk upwardly so that when said cylinder first enters the opening in said seat flow of solids through the valve is stopped and then on further upward movement granular solids are forced into the space in said chamber and said disk is forced against said seat to establish a gas-tight closure.

5. A valve for use with flowing granular solids which comprises in combination: a body with passageway extending therethrough from an upwardly facing inlet to a downwardly facing outlet, a downwardly facing substantially horizontal seat ring extending across said body, a bonnet connected into said body at a level above said seat ring, a longitudinally movable stem extending downwardly through said bonnet and centrally through said seat ring to a level below said seat, a disk of a size and shape suitable to fit snugly against the downwardly facing seat ring, whereby said valve may be closed by moving said disk upwardly against said seat ring, a cylinder connected to the top of said disk, said cylinder being of a diameter such that it will pass into the opening in said seat ring and stop the flow of granular solids through the valve and of a height such that when said disk is moved upwardly a void space will be created below said disk of greater volume than the volume between the seating surfaces of said disk and said seat ring at the position in the upward movement of said disk and said cylinder when said cylinder first enters the opening in said seat ring, a receiving chamber enclosed on top and sides positioned directly above said seat ring and having a plurality of ports for granular solids flow horizontally spaced around its lower section, whereby when the valve is opened granular solids may flow from the inlet end of said passageway downwardly through said ports and said seat ring to the outlet end of said passageway, the volume of said chamber above lines which extend downwardly to the vertical center line of said chamber from the upper edge of each of said ports at angles of 30 degrees with the horizontal being greater than the volume of said cylinder on said disk, whereby as said valve is closed the granular solids lying directly above said cylinder will be forced upwardly into said chamber.

6. A valve for use with flowing granular solids which comprises in combination: a body with passageway extending downwardly therethrough from an upwardly facing inlet to a downwardly facing outlet, a downwardly facing seat ring extending across said body, a stem extending into said body above said seat ring and centrally through the opening in said seat ring to a level therebelow, a disk connected to the lower end of said stem below said seat ring and having an upwardly faced seating surface suitable to be forced against said seat ring to close said valve, a cylinder connected to the top of said disk, said cylinder being of such a diameter that as it is moved upwardly it fits into the opening in said seat ring with a clearance within the range about 0.005 to 0.0625 inch and being of such a height that the volume of said cylinder will be in excess of the annular volume lying directly between the seating surface of said disk and said seat ring at the position when said cylinder first enters said seat ring as said disk and cylinder are moved upwardly by said stem, said cylinder further having a serrated upper end which is beveled so that the top of said cylinder is of substantially less diameter than the opening and said cylinder having at least one helical groove extending continuously around its outer periphery, an upwardly extending valve bonnet around said stem connecting into said passageway above said seat ring at an angle to said passageway and extending upwardly above the intersection with said passageway so as to leave a substantial space in said bonnet above said intersection, the volume of said space above a line extending downwardly at 30 degrees with the horizontal from the upper point of intersection of said bonnet with said passageway being greater than the volume of said cylinder, said valve being closed by moving said cylinder and disk upwardly so that when said cylinder first enters said seat ring flow of solids through the valve is stopped and then on further upward movement granular solids are forced by said cylinder into said space and said disk is forced against said seat ring to establish a gas-tight closure.

References Cited in the file of this patent

UNITED STATES PATENTS

| | | |
|---|---|---|
| 561,018 | Moyer | May 26, 1896 |
| 1,439,259 | Pasnik | Dec. 19, 1922 |
| 1,938,942 | Swartz | Dec. 12, 1933 |

FOREIGN PATENTS

| | | |
|---|---|---|
| 882,598 | France | Mar. 1, 1943 |